(12) United States Patent
Bonitatebus, Jr. et al.

(10) Patent No.: US 6,797,380 B2
(45) Date of Patent: Sep. 28, 2004

(54) NANOPARTICLE HAVING AN INORGANIC CORE

(75) Inventors: Peter John Bonitatebus, Jr., Guilderland, NY (US); Havva Yagci Acar, Clifton Park, NY (US); Michael Larsen, Clifton Park, NY (US)

(73) Assignee: General Electric Company, Niskayuna, NY (US)

(*) Notice: Subject to any disclaimer, the term of this patent is extended or adjusted under 35 U.S.C. 154(b) by 36 days.

(21) Appl. No.: 10/208,946

(22) Filed: Jul. 31, 2002

(65) Prior Publication Data

US 2004/0023030 A1 Feb. 5, 2004

(51) Int. Cl.[7] ............................................. B32B 5/16
(52) U.S. Cl. ................. 428/403; 428/407; 428/405; 428/694 B; 430/106.6
(58) Field of Search ................. 428/403, 407, 428/405, 634 B; 430/106.6

(56) References Cited

U.S. PATENT DOCUMENTS

| | | | |
|---|---|---|---|
| 3,592,185 A | | 7/1971 | Frie et al. |
| 4,976,883 A | | 12/1990 | Takao et al. |
| 5,147,573 A | | 9/1992 | Chagnon et al. |
| 5,660,772 A | * | 8/1997 | Stangle et al. ............ 264/6 |
| 5,660,773 A | * | 8/1997 | Stangle et al. ............ 264/6 |
| 5,660,774 A | * | 8/1997 | Stangle et al. ......... 505/425 |
| 6,413,638 B1 | * | 7/2002 | Mager et al. ........... 428/403 |
| 6,627,314 B2 | * | 9/2003 | Matyjaszewski et al. ... 428/403 |

FOREIGN PATENT DOCUMENTS

| | | |
|---|---|---|
| DE | 19624426 | 1/1998 |
| DE | 19923625 | 11/2000 |
| WO | 03057175 | 7/2000 |

OTHER PUBLICATIONS

Jörg Rockenberger et al, "A New Nonhydrolytic Single–Precursor Approach to Surfactant–Capped Nanocrystals of Transition Metal Oxides", American Chemical Society, vol. 121, No. 49, pp. 11595–11596, 1999.

Tcipi Fried et al., "Ordered Two–Dimensional Arrays of Ferrite Nanoparticles", Advanced Materials, vol. 13, No. 15, pp. 1158–1161, Aug. 3, 2001.

Lifen Shen et al., Structure of Alkanoic Acid Stabilized Magnetic Fluids. A Small–Angle Neutron and Light Scattering Analysis, American Chemical Society, vol. 17, No. 2, pp. 288–299, 2001.

Turro, Nicholas J. et al., "Spectroscopic Probe of the Surface of Iron Oxide Nanocrystals", American Chemical Society, NANO Letters, vol. 0, No. 0, pp. A–D, 2002.

Wang et al., "Effect of Solvents on the Preparation of Silica–Coated Magnetic Particles", Chemistry Letters 2001, pp. 1168–69.

Michael A. Brook, "Silicon in Organic, Organometallic, and polymer Chemistry", John Wiley & Sons, New York, 2000, p. 282.

* cited by examiner

*Primary Examiner*—Leszek Killiman
(74) *Attorney, Agent, or Firm*—Tanzina S. Chowdhury; Robert P. Santandrea; Patrick K. Patnode

(57) ABSTRACT

A nanoparticle comprising an inorganic core and a polymerizable outer coating. The inorganic core comprises a substantially crystalline inorganic material such as a superparamagnetic material. In one embodiment, the inorganic core comprises a single crystal mixed spinel ferrite comprising iron in a first oxidation state and at least one metal in a second oxidation state, wherein the second oxidation state is different from the first oxidation state.

53 Claims, 6 Drawing Sheets

100

- S10 — Combine solvent, oxidant, surfactant
- S12 — Provide organometallic compounds
- S14 — Heat to first temperature for first time interval

NANOPARTICLE HAVING AN INORGANIC CORE

BACKGROUND OF INVENTION

The invention relates to a nanoparticle having a core of inorganic material having a coating disposed on the core. More particularly, the invention relates to a nanoparticle having a crystalline mixed spinel ferrite core and a polymerizable outer coating disposed on the crystalline mixed spinel ferrite core.

Nanotechnology, relating particularly to the formation of a plurality of nanoparticles, has found application in a number of fields, such as diagnostic medicine, molecular imaging, and electronics. Magnetic nanoparticles may be used in magnetic recording, drug delivery, biomolecular separation, and as sensors. Superparamagnetic nanoparticles may, for example, be incorporated into magnetic resonance imaging (MRI) contrast agents, where they serve as signal-generating core nuclei.

The nanoparticles obtained by the current methods also have a low level of crystallinity. Moreover, the nanoparticles tend to agglomerate, due to strong interparticle interactions. When such agglomeration occurs, the efficacy of the nanoparticles in a given application is lost. Therefore, what is needed is a nanoparticle having a crystalline inorganic core. What is also needed is that is a nanoparticle that is resistant to agglomeration.

SUMMARY OF INVENTION

The present invention meets these and other needs by providing a nanoparticle comprising a core and a polymerizable outer coating. The core comprises an inorganic material such as, for example, a superparamagnetic material, which is substantially crystalline.

Accordingly, one aspect of the invention is to provide a nanoparticle. The nanoparticle comprises an inorganic core, wherein the inorganic core is substantially crystalline and has a diameter in a range from about 1 nm to about 1000 nm; and at least one outer coating substantially covering the inorganic core, the at least one outer coating comprising an ionizable stabilizing material having at least one functionalized group.

A second aspect is to provide an inorganic nanoparticle. The inorganic nanoparticle has a diameter in the range from 1 to 1000 nm and comprises a single crystal of at least one spinel ferrite, wherein the at least one spinel ferrite comprises iron in a first oxidation state and a transition metal in a second oxidation state, wherein the second oxidation state is different from the first oxidation state.

A third aspect of the invention is to provide a nanoparticle. The nanoparticle comprises: an inorganic core, the inorganic core having a diameter in the range from 1 to 1000 nm and comprising a single crystal of at least one spinel ferrite, wherein the at least one spinel ferrite comprises iron in a first oxidation state and a transition metal in a second oxidation state, wherein said second oxidation state is different from said first oxidation state; and at least one outer coating substantially covering said inorganic core, said at least one outer coating comprising an ionizable stabilizing material having at least one functionalized group.

A fourth aspect of the invention is to provide a plurality of nanoparticles, wherein each of the plurality of nanoparticles comprises an inorganic core, wherein said inorganic core comprises a first inorganic material and is substantially crystalline and has a diameter in a range from about 1 nm to about 1000 nm; and at least one outer coating substantially covering the inorganic core, the at least one outer coating comprising at least one ionizable stabilizing material having at least one functionalized group, wherein the plurality of nanoparticles is substantially monodisperse.

These and other aspects, advantages, and salient features of the present invention will become apparent from the following detailed description, the accompanying drawings, and the appended claims.

BRIEF DESCRIPTION OF DRAWINGS

FIG. 2 is a flow diagram showing a method of forming a plurality of nanoparticles;

DETAILED DESCRIPTION

Figure 1:
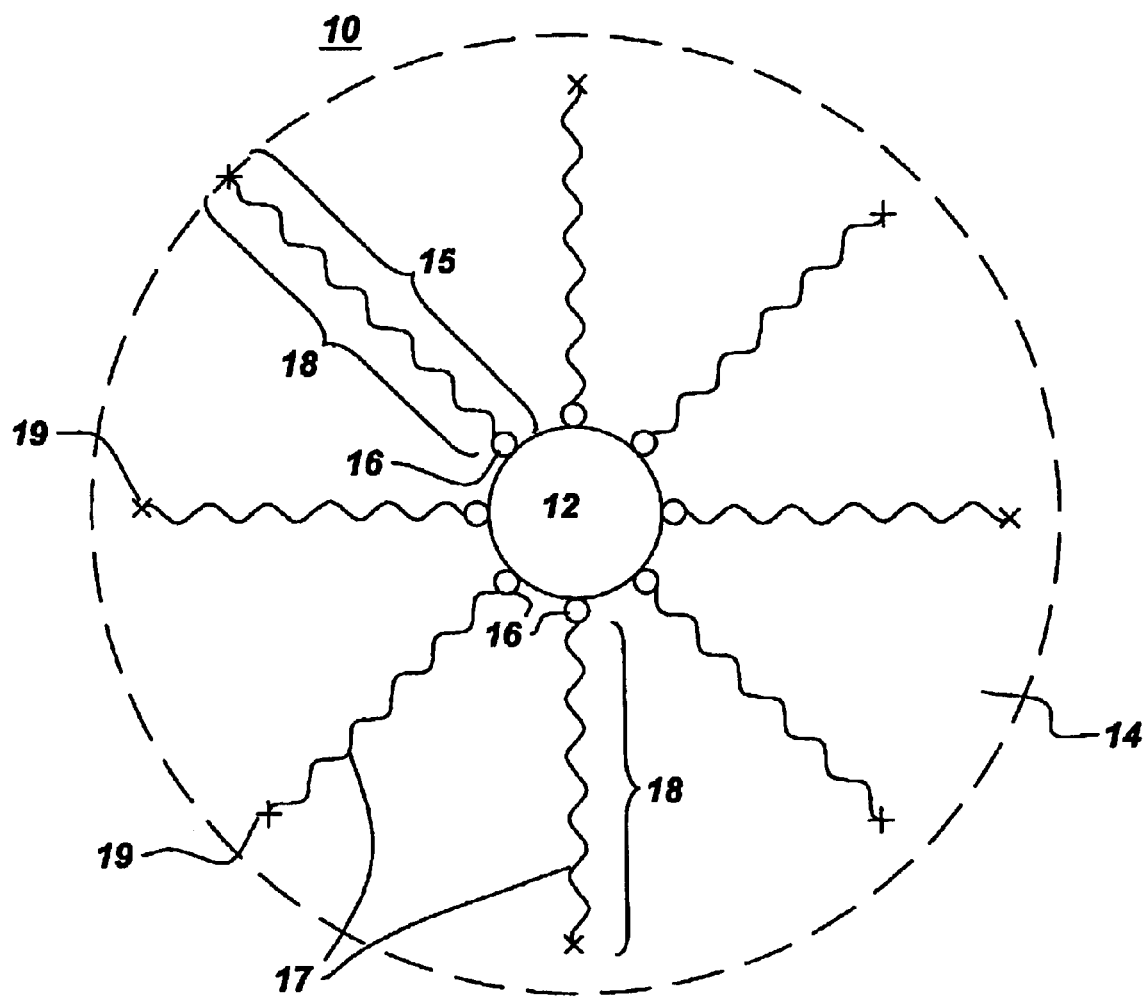
FIG. 1 is a schematic representation of a cross-sectional view of a nanoparticle of the present invention.

In the following description, like reference characters designate like or corresponding parts throughout the several views shown in the figures. It is also understood that terms such as "top", "bottom", "outward", "inward", and the like are words of convenience and are not to be construed as limiting terms.

Referring to the drawings in general and to FIG. 1 in particular, it will be understood that the illustrations are for the purpose of describing a preferred embodiment of the invention and are not intended to limit the invention thereto. Referring to the drawings in general and to FIG. 1 in particular, it will be understood that the illustrations are for the purpose of describing a preferred embodiment of the invention and are not intended to limit the invention thereto.

A schematic representation of a cross-sectional view of a nanoparticle of the present invention is shown in FIG. 1. Nanoparticle 10 comprises an inorganic core 12 and outer coating 14. Inorganic core 12 comprises substantially crystalline inorganic material and has a diameter in a range from about 1 nm to about 1000 nm. In this context, "substantially crystalline" is understood to mean that inorganic core 12 comprises at least 50 volume percent and, preferably, at least 75 volume percent, crystalline material. Most preferably, inorganic core 12 is a single crystal. In one embodiment, inorganic core 12 has a diameter in a range from about 1 nm to about 100 nm. In yet another embodiment, inorganic core 12 has a diameter in a range from about 1 nm to about 10 nm.

Inorganic core 12 may comprise a variety of inorganic materials, including, but not limited to, transition metals in elemental form, metal oxides, and superparamagnetic materials that are known in the art. For example, an inorganic core 12 comprising superparamagnetic material may include one of elemental iron, a spinel ferrite ($Fe_3O_4$), or at least one mixed spinel ferrite having the general formula $MFe_2O_4$, where M is a metal having an oxidation state other than exhibited by the predominant form that of iron, which is 3+. Non-limiting examples of M include iron (where a portion of the iron present iron is $Fe^{2+}$; i.e., iron having a 2+ oxidation state), copper, titanium, manganese, cobalt, nickel, chromium, gadolinium, zinc, yttrium, molybdenum, and vanadium.

In one particular embodiment, inorganic core 12 is spherical and has a diameter in a range from about 1 nm to about 1000 nm. Inorganic core 12 may, in one embodiment, be in shape.

Outer coating 14 is disposed on an outer surface of inorganic core 12 such that outer coating 14 substantially covers and encloses inorganic core 12. Outer coating 14 serves to stabilize inorganic core 12; i.e., outer coating 14 prevents contact inorganic 12 from contacting an adjacent inorganic core, thereby preventing a plurality of such nanoparticles from agglomerating. Thus, outer coating 14 is sufficiently thick to stabilize inorganic core 12 and prevent such contact. In one embodiment, outer core 14 has thickness in a range from about 1 nm to about 50 nm and, more preferably in a range from about 1.5 nm to about 3 nm.

The constituents of outer coating 14 may eventually undergo at least one polymerization reaction to provide a more permanent polymerized "shell" for inorganic core 12. Alternatively, the material—or materials—comprising outer coating 14 may later be replaced by other materials that are tailored for a particular application, such as, but not limited to, diagnostic applications.

Figure 7:
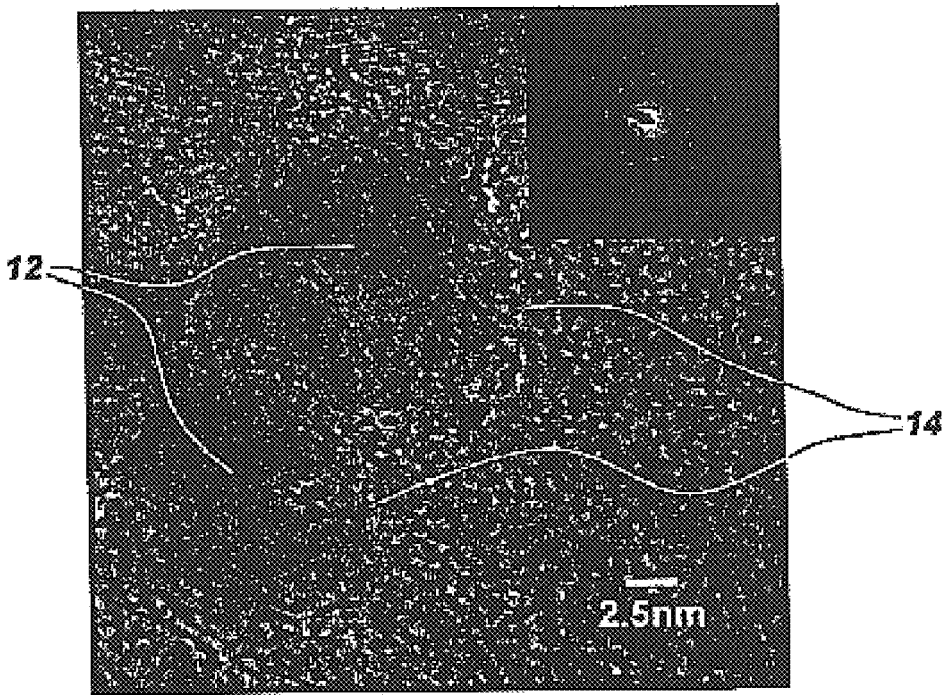
FIG. 7 is a high resolution transmission electron microscopic image of spinel-structured mixed iron oxide nanocrystals having an outer coating.

An example of nanoparticle 10 is shown in FIG. 7. Inorganic core 12 comprises the crystalline mixed iron oxide $(\gamma\text{-}Fe_2O_3)_{1-y}(Fe_3O_4)_y$. Outer coating 14, comprising 10-undecenate, is bound to inorganic core 12.

Outer coating 14 comprises an ionizable stabilizing material 15 having at least one functionalized group or a plurality of such ionizable stabilizing materials. The ionizable stabilizing material, in one embodiment, may comprise a siloxane. In another embodiment, the ionizable stabilizing material 15 comprises at least one ionizable head portion 16 that couples to the surface of inorganic core 12 and at least one tail portion 18, which includes the at least one functionalized group. The at least one ionizable head portion comprises at least one of an alcohol, a thiol (including thiolates), an amine, an organic carboxylate, an organic sulfonate, an organic phosphonate, and an organic phosphinate.

The at least one tail portion 18 is coupled to the at least one ionizable head portion 16 and extends therefrom in a direction opposite the surface of inorganic core 12 the at least one tail portion 18 may, in one embodiment, include an internal portion 17 and a terminal portion 19. The at least one functionalized group may be located in either the terminal portion 19 or internal portion 17 of the at least one tail portion. In a preferred embodiment of the invention, the at least one functionalized group is located in terminal portion 19. Tail portion 18 comprises a hydrocarbon and is hydrophobic.

The at least one functionalized group may comprise, but is not limited to, a polymerizable functionalized group, an initiating functionalized group, and a cross-linking functionalized group. The polymerizable functionalized group may comprise at least one of an alkene, an alkyne, a vinyl (including acrylics and styrenics), an epoxide, an azeridine, a cyclic ether, a cyclic ester, and a cyclic amide. The initiating functionalized group may comprise at least one of a thermal or photoinitiator, such as, but not limited to, an azo compound, a hydroxide, a peroxide, an alkyl halide, an aryl halide, a halo ketone, a halo ester, a halo amide, a nitroxide, a thiocarbonyl, a thiol, an organo-cobalt compound, a ketone, and an amine. The crosslinking functionalized group may comprise one of a thiol, an aldehyde, a ketone, a hydroxide, an isocyanide, an alkyl halide, an aryl halide, a carboxylate, a carboxylic acid, a phenol, and an amine.

Nanoparticle 10 is formed by a non-aqueous synthetic route for the formation of monodisperse crystalline nanoparticles, which is described in U.S. patent application Ser. No. 10/208,945, entitled "Method of Making Crystalline Nanoparticles" filed on Jul. 31, 2002, by Peter John Bonitatebus, Jr., Havva Yagci Acar and Michael (NMN) Larsen, the contents of which are incorporated herein by reference in their entirety. Organometallic precursor materials, such as, but not limited to, transition metal carbonyl compounds, are thermally decomposed in a solvent and in the presence of a surfactant and an oxidant. The organometallic precursors are provided in an appropriate stoichiometric ratio to a nonpolar aprotic solvent containing the surfactant and the oxidant.

A flow diagram for a method 100 of forming a plurality of crystalline nanoparticles 10 is shown in FIG. 2. Referring to FIG. 2, step S10 comprises combining a nonpolar aprotic organic solvent, an oxidant, and a first surfactant. The nonpolar aprotic solvent is thermally stable at the temperatures at which the plurality of nanoparticles are formed. In one embodiment, the nonpolar aprotic solvent has a boiling point in the range from about 275° C. to about 340° C. Suitable nonpolar aprotic solvents include, but are not limited to, dioctyl ether, hexadecane, trioctylamine, tetraethylene glycol dimethyl ether (also known as "tetraglyme"), and combinations thereof. The oxidant comprises at least one of an organo-tertiary amine oxide, a peroxide, an alkylhydroperoxide, a peroxyacid, molecular oxygen, nitrous oxide, and combinations thereof. In one embodiment, the oxidant comprises an organo-tertiary amine oxide having at least one methyl group. One non-limiting example of such an oxidant is trimethyl amine oxide.

The first surfactant comprises at least one of a polymerizable functionalized group, an initiating functionalized group, and a cross-linking functionalized group. An amount of the first surfactant is provided to the nonpolar aprotic organic solvent to produce a first concentration of the first surfactant in the nonpolar aprotic solvent. The polymerizable functionalized group may comprise at least one of an alkene, an alkyne, a vinyl (including acrylics and styrenics), an epoxide, an azeridine, a cyclic ether, a cyclic ester, and a cyclic amide. The initiating functionalized group may comprise at least one of a thermal or photoinitiator, such as, but not limited to, an azo compound, a hydroxide, a peroxide, an alkyl halide, an aryl halide, a halo ketone, a halo ester, a halo amide, a nitroxide, a thiocarbonyl, a thiol, an organo-cobalt compound, a ketone, and an amine. The cross-linking functionalized group may be one of a thiol, an aldehyde, a ketone, a hydroxide, an isocyanide, an alkyl halide, a carboxylate, a carboxylic acid, a phenol, an amine, and combinations thereof.

In step S12, at least one organometallic compound is provided to the combined nonpolar aprotic organic solvent, oxidant, and first surfactant. The at least one organometallic compound comprises at least one metal and at least one ligand. The metal may comprise a transition metal, such as, but not limited to, iron, nickel, copper, titanium, cadmium, cobalt, chromium, manganese, vanadium, yttrium, zinc, and molybdenum, or other metals, such as gadolinium. The at least one ligand may comprise at least one of carbonyl group, a cyclo octadienyl group, an organophosphine group, a nitrosyl group, a cyclo pentadienyl group, a pentamethyl cyclo pentadienyl group, a π-acid ligand, a nitroxy group, and combinations thereof. Non-limiting examples of the at least one organometallic compound include iron carbonyl ($Fe(CO)_5$), cobalt carbonyl ($Co(CO)_8$), and manganese carbonyl ($Mn_2(CO)_{10}$). In one embodiment, an amount of the at least one organometallic compound is provided to the aprotic solvent such that a ratio of the concentration of the at least one organometallic compound to the concentration of the oxidant has a value in a range from about 1 to about 10.

In one embodiment, S12 may include a step in which a first organometallic compound is provided to the combined nonpolar aprotic organic solvent, oxidant, and first surfactant. The combined first organometallic compound, nonpolar aprotic organic solvent, oxidant, and first surfactant are then preheated under an inert gas atmosphere to a temperature for a time interval. The preheating serves to remove the ligands from the metal cation in the first organometallic compound. In one embodiment, the combined first organometallic compound, nonpolar aprotic organic solvent, oxidant, and first surfactant are preheated to a temperature in a range from about 90° C. to about 140° C. for a time interval ranging from about 15 minutes to about 90 minutes.

In step S14, the combined nonpolar aprotic solvent, oxidant, first surfactant, and the at least one organometallic compound are heated to under an inert gas atmosphere to a first temperature and maintained at the first temperature for a first time interval. At this point, the at least one organometallic compound reacts with the oxidant in the presence of the first surfactant and the nonpolar aprotic solvent to form a plurality of nanoparticles, wherein each nanoparticle 10 comprises a nanocrystalline inorganic core 12 and at least one outer coating 14 comprising the first surfactant, which is disposed on an outer surface of the inorganic core 12 and substantially covers and encloses the nanocrystalline inorganic core 12.

The first temperature to which the combined in S14 nonpolar aprotic solvent, oxidant, first surfactant, and the at least one organometallic compound are heated is dependent upon the relative thermal stability of the at least one organometallic compound that is provided to the aprotic solvent. The first temperature is in a range from about 30° C. to about 400° C. In one embodiment, the first temperature is in a range from about 275° C. to about 400° C. and, preferably, in a range from about 275° C. to about 310° C. The length of the first time interval may be from about 30 minutes to about 2 hours, depending on the particular organometallic compounds and oxidants that are provided to the aprotic solvent.

In one embodiment, method 100 may further comprise the step of precipitating the plurality of nanoparticles from the nonpolar aprotic solvent. Precipitation of the plurality of nanoparticles may be accomplished by adding at least one of an alcohol or a ketone to the nonpolar aprotic solvent. Alcohols such as, but not limited to, methanol and ethanol may be used. Alcohols having at least three carbon atoms, such as isopropanol, are preferred, as their use tends to produce the smallest degree of agglomeration of the plurality of nanparticles. Ketones such as, but not limited to, acetone may be used in conjunction with—or separate from—an alcohol in the precipitation step.

In another embodiment, method 100 may also further include a step in which a second surfactant either partially of completely replaces—or is exchanged for—the first surfactant in outer coating 14. Following the formation of the plurality of nanoparticles, the second surfactant is added to the nonpolar aprotic solvent such that the second surfactant is present in a second concentration, the second concentration being greater than a first concentration of the first surfactant in the nonpolar aprotic solvent. The second surfactant comprises at least one of a polymerizable functionalized group, an initiating functionalized group, and a cross-linking functionalized group and is different from the first surfactant. Suitable polymerizable functionalized groups, initiating functionalized groups, and cross-linking functionalized groups for the second surfactant are the same as those groups that are suitable for the first surfactant, and have been previously described herein.

In some instances, the differences in the first concentration and second concentration are sufficient to drive the substitution of the second surfactant for the first surfactant in outer coating 14 of each of the plurality of nanoparticles. In one embodiment, the substitution of the second surfactant for the first surfactant may further include heating the nonpolar aprotic solvent containing the plurality of nanoparticles to a second temperature for a second time interval. Preferably, the second temperature is in a range from about 25° C. to about 80° C. and the second time interval is about one hour.

It is understood that method 100 may include substitution of the second surfactant for the first surfactant in the outer coating 14 of each of the plurality of nanoparticles, followed by precipitation of the plurality of nanoparticles.

Figure 3:
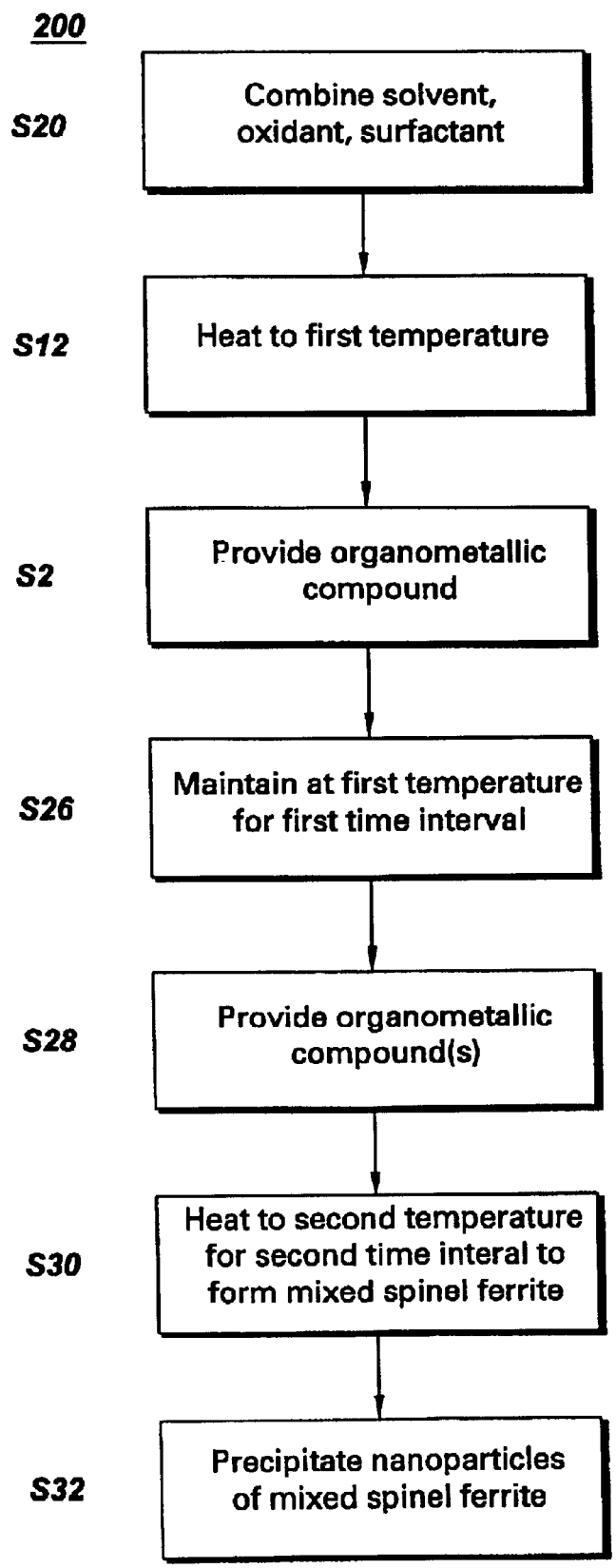
FIG. 3 is a flow diagram showing a method of forming a plurality of nanoparticles having a crystalline mixed spinel ferrite core.

In one particular embodiment, flow chart for a method 200 of forming a plurality of monodisperse crystalline nanoparticles 10, wherein each of the plurality of monodisperse nanoparticles comprises a crystalline mixed spinel ferrite core and an outer coating 14 disposed on an outer surface of the crystalline mixed spinel ferrite core is shown in FIG. 3. The crystalline mixed spinel ferrite core comprises iron in a first oxidation state and a transition metal in a second oxidation state, wherein the second oxidation state is different from the first oxidation state.

In step S20 of method 200, an oxidant and a first surfactant are combined a nonpolar aprotic organic solvent. In one embodiment, the nonpolar aprotic organic solvent has a boiling point in a range from about 275° C. to about 340° C. Suitable nonpolar aprotic solvents include, but are not limited to, dioctyl ether, hexadecane, trioctylamine, trioctylamine, tetraethylene glycol dimethyl ether (also known as "tetraglyme"), and combinations thereof. The oxidant comprises at least one of an organo-tertiary amine oxide, a peroxide, an alkylhydroperoxide, a peroxyacid, molecular oxygen, nitrous oxide, and combinations thereof. In one embodiment, the oxidant comprises an organo-tertiary amine oxide having at least one methyl group. One non-limiting example of such an oxidant is trimethyl amine oxide. The first surfactant comprises at least one of a polymerizable functionalized group, an initiating functionalized group, and a cross-linking functionalized group. An amount of the first surfactant is provided to the nonpolar aprotic organic solvent to produce a first concentration of the first surfactant in the nonpolar aprotic solvent. Suitable polymerizable functionalized groups, initiating functionalized groups, and cross-linking functionalized groups for the first surfactant are the same as those that have been previously described herein.

Step S22 comprises heating the combined nonpolar aprotic solvent, oxidant, and first surfactant under an inert gas atmosphere to a first temperature. In one embodiment, the first temperature is in a range from about 90° C. to about 140° C. An organo-iron compound is then provided to the combined nonpolar aprotic solvent, oxidant, and first surfactant at the first temperature (step S24). The organo-iron compound, together with the combined nonpolar aprotic solvent, oxidant, and first surfactant, is maintained at the first temperature for a first time interval under an inert gas atmosphere (step S26). In step S26, the ligands are removed form the organo-iron compound in the presence of the oxidant; the first time interval must therefore be of sufficient duration to accomplish the removal. In one embodiment, the first time interval may be from about 15 minutes to about 90 minutes.

The organo-iron compound comprises iron and at least one ligand. In one embodiment, the at least one ligand comprises at least one of a carbonyl group, a cyclo octadienyl group, an organophosphine group, a nitrosyl group, a cyclo pentadienyl group, a pentamethyl cyclo pentadienyl group, a π-acid ligand, a nitroxy group, and combinations thereof. One non-limiting example of the organo-iron compound is iron carbonyl ($Fe(CO)_5$).

Following the expiration of the first time interval, at least one organo-transition metal compound is added to and combined with the organo-iron compound and the combined nonpolar aprotic solvent, oxidant, and first surfactant together at the first temperature (step S26). The at least one organo-transition metal compound comprises a transition metal and at least one ligand. In one embodiment, the transition metal is one of iron, nickel, copper, titanium, cobalt, chromium, manganese, vanadium, yttrium, zinc, and molybdenum, and the at least one ligand comprises at least one of a carbonyl group, a cyclo octadienyl group, an organophosphine group, a nitrosyl group, a cyclo pentadienyl group, a pentamethyl cyclo pentadienyl group, a π-acid ligand, a nitroxy group, and combinations thereof. Analogous organo-metallic compounds of selected metals, such as gadolinium, maybe substituted for organo-transition metal compounds. Non-limiting examples of the at least one organo-transistion metal compound include cobalt carbonyl ($Co(CO)_8$) and manganese carbonyl ($Mn_2(CO)_{10}$).

In step S30, the at least one organo-transition metal compound, organo-iron compound, nonpolar aprotic solvent, oxidant, and first surfactant, now combined together, are heated to a second temperature and maintained at the second temperature for a second time interval. The organo-iron compound reacts with the at least one organo-transition metal compound at the second temperature to form a plurality of monodisperse nanoparticles, wherein each of the plurality of monodisperse nanoparticles comprises a crystalline mixed spinel ferrite core and an outer coating comprising the first surfactant, disposed on an outer surface of the crystalline mixed spinel ferrite core. Iron carbonyl ($Fe(CO)_5$), for example, may react with cobalt carbonyl ($Co(CO)_8$) in step S28 to form nanoparticles comprising the crystalline cobalt iron spinel ferrite $CoFe_2O_4$. Alternatively, iron carbonyl may react with manganese carbonyl ($Mn_2(CO)_{10}$) in step S28 to form nanoparticles comprising the crystalline manganese iron spinel ferrite $MnFe_2O_4$. Where the at least one organo-transition metal compound comprises iron carbonyl, nanoparticles comprising the crystalline mixed γ-iron oxide/ferrite $(\gamma-Fe_2O_3)_{1-y}(Fe_3O_4)_y$ are formed.

In one embodiment, the second temperature is in a range from about 285° C. to about 400° C. In a second embodiment, the second temperature is in a range from about 275° C. to about 310° C. In one embodiment, the second time interval may range from about 30 minutes to about two hours.

The plurality of nanoparticles are precipitated from the nonpolar aprotic solvent in step S32 by adding at least one of an alcohol or a ketone to the nonpolar aprotic solvent. Alcohols such as, but not limited to, methanol and ethanol may be used. Alcohols having at least three carbon atoms, such as isopropanol, are preferred, as their use tends to produce the smallest degree of agglomeration. Ketones such as, but not limited to, acetone may be used in conjunction with—or separate from—an alcohol in the precipitation step.

Method 200 may also further include a step in which a second surfactant replaces—or is exchanged for—the first surfactant in outer coating 3, as previously described herein. Alternatively, method 200 may further comprise the step of precipitating the plurality of nanoparticles from the nonpolar aprotic solvent, as previously described herein. Finally, method 200 may further comprise substitution of the second surfactant for the first surfactant in the outer coating 3 of each of the plurality of nanoparticles, followed by precipitation of the plurality of nanoparticles.

The plurality of nanoparticles produced by methods 100 and 200 are monodisperse; i.e., the nanoparticles are substantially identical in size and shape. For example, cobalt iron spinel ferrite ($CoFe_2O_4$) nanoparticles produced using the methods described herein exhibit about a 10% variation in diameter (5 nm±0.5 nm). Similarly, manganese iron spinel ferrite $MnFe_2O_4$ nanoparticles produced using the methods described herein exhibit about a 10% variation in diameter (10.6 nm±0.16 nm).

The following examples serve to illustrate the features and advantages of the present invention.

EXAMPLE 1

A mixture of trimethylamine-N-oxide (7.59 millimoles (mmol)), lauric acid (4.54 mmol), and 10 ml deoxygenated hexadecane, each individually dehydrated, were added under an inert atmosphere in a glove box to a 50 ml 2-neck Schlenk flask. The flask was attached to a Schlenk vacuum, and a column-reflux condenser assembly was attached under a blanket of $N_2$. The mixture was homogenized with vigorous stirring and heating to about 100° C.

About 1.01 millimoles (mmol) iron carbonyl ($Fe(CO)_5$) were then added to the slowly stirred reaction solution, which was at a temperature in a range from about 100° C. to about 105° C., resulting in instantaneous and aggressive reaction. Iron carbonyl addition was complete and the intense reaction subsided in less than a minute. The reaction mixture was then heated to a temperature in a range from about 120° C. to about 130° C. under $N_2$ and maintained at temperature for 1 hour with vigorous stirring.

Figure 4A:
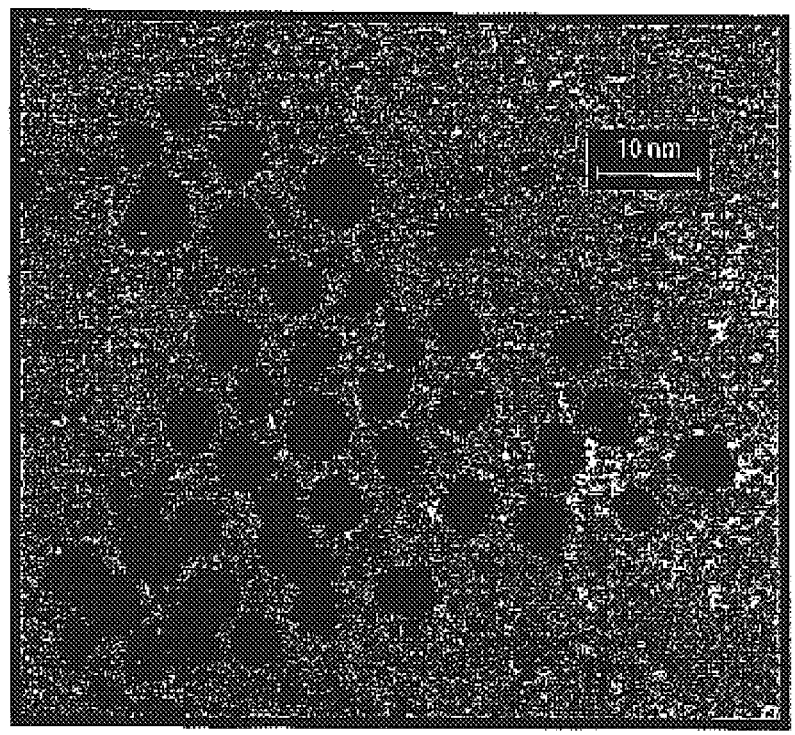
FIG. 4a is a transmission electron microscopic image of cobalt iron oxide nanoparticles of the present invention.
Figure 4B:
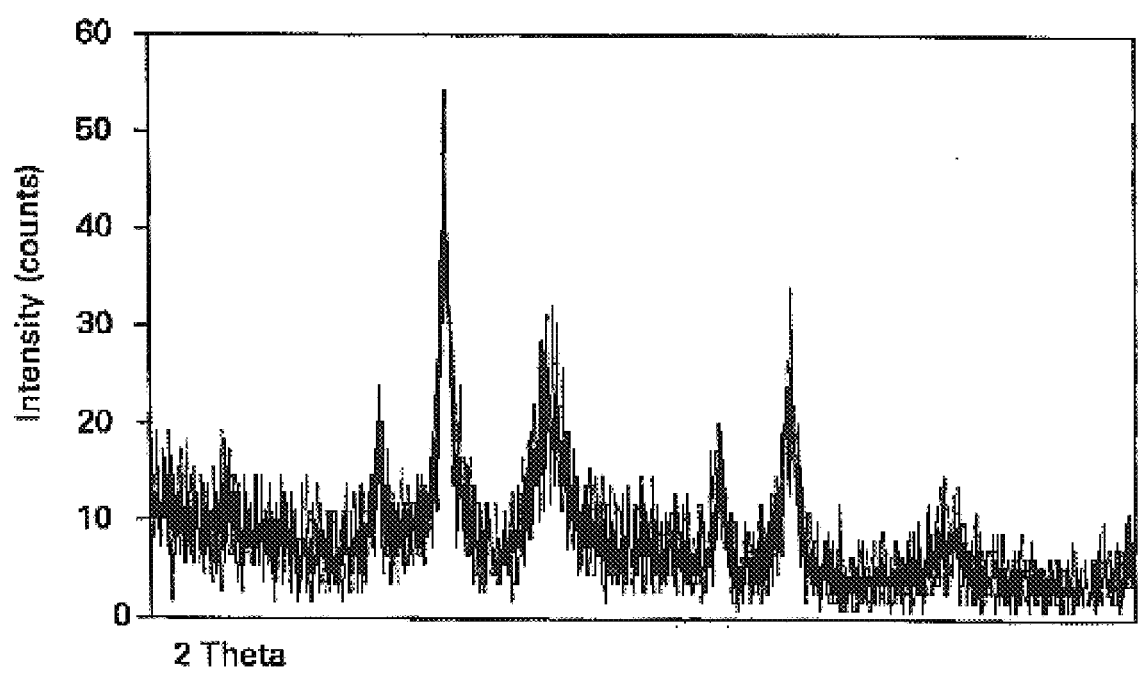
FIG. 4b is an x-ray diffraction pattern of cobalt iron oxide nanoparticles of the present invention.

About 0.25 mmol of cobalt carbonyl ($Co_2(CO)_8$) was then added to the reaction mixture, turning the solution royal purple in color. The temperature of the reaction mixture was rapidly increased to about 300° C. to allow the reaction mixture to reflux. After 1 hour of refluxing and stirring at about 300° C., the color of the reaction mixture appeared to turn black. The reaction mixture was then cooled to room temperature, and an excess of amount of ethanol was added to the reaction mixture, yielding a black precipitate. The precipitate was separated by centrifuging and collected. The collected black powder was then washed with an ethanol/acetone mixture and dried. Crystal structure, composition, and particle size analysis of the powder were obtained by transmission electron microscopy (TEM) imaging, energy dispersive x-ray (EDX) elemental analysis, x-ray absorption spectroscopy (XAS), and selected area electron diffraction/x-ray diffraction (SAED-XRD) pattern crystal symmetry pattern indexing. The powder obtained was found to comprise monodisperse spinel-structured cobalt iron oxide ($CoFe_2O_4$) nanocrystals, each having a particle size of about 5 nm. A TEM image of the $CoFe_2O_4$ nanocrystals that were obtained is shown in FIG. 4a, and the SAED-XRD diffraction pattern, showing the cubic spinel crystal structure of the $CoFe_2O_4$ nanocrystals, is pictured in FIG. 4b.

EXAMPLE 2

A mixture of trimethylamine-N-oxide (7.60 mmol), lauric acid (4.56 mmol), and 7 ml of deoxygenated dioctyl ether, each individually dehydrated, were added under an inert atmosphere in a glove box to a 50 ml 2-neck Schlenk flask. The flask was attached to a Schlenk vacuum line, and a column-reflux condenser assembly was attached under a blanket of $N_2$. The mixture was homogenized with vigorous stirring and heating to about 100° C.

About 1.52 mmol of iron carbonyl ($Fe(CO)_5$) were then added to the slowly stirred reaction solution, which was at a temperature in a range from about 100° C. to about 105° C., resulting in instantaneous and aggressive reaction. Iron carbonyl addition was complete and the intense reaction subsided in less than a minute. The reaction mixture was then heated to a temperature in a range from about 120° C. to about 130° C. under $N_2$ and maintained at temperature for 1 hour with vigorous stirring.

Figure 5A:
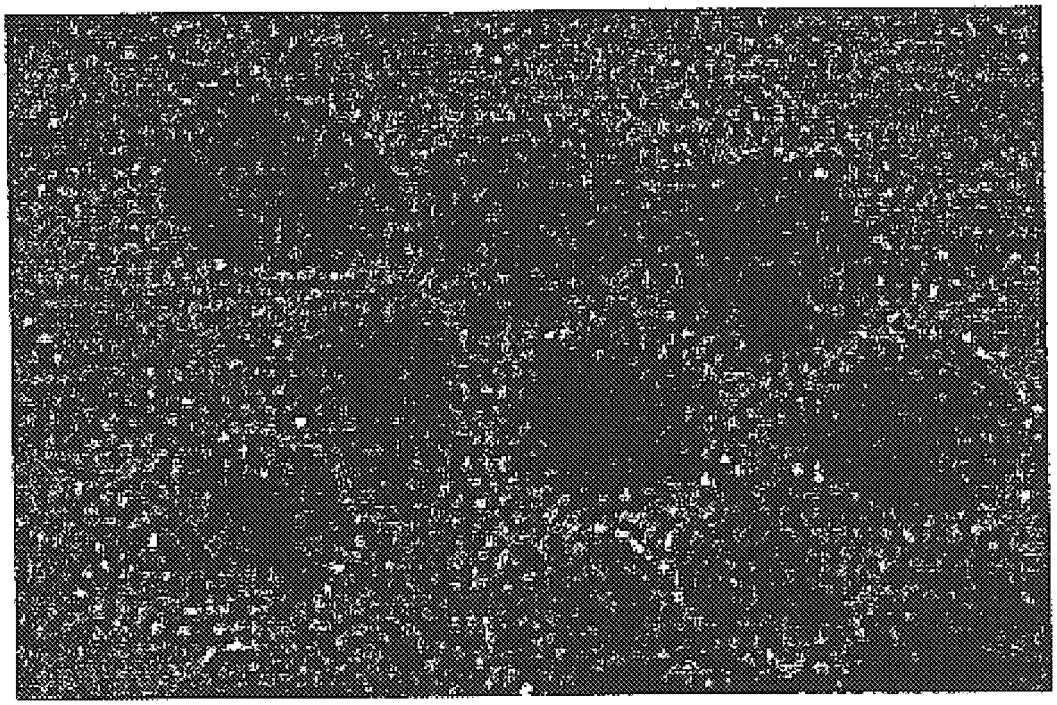
FIG. 5a is a transmission electron microscopic image of manganese iron oxide nanoparticles of the present invention.
Figure 5B:
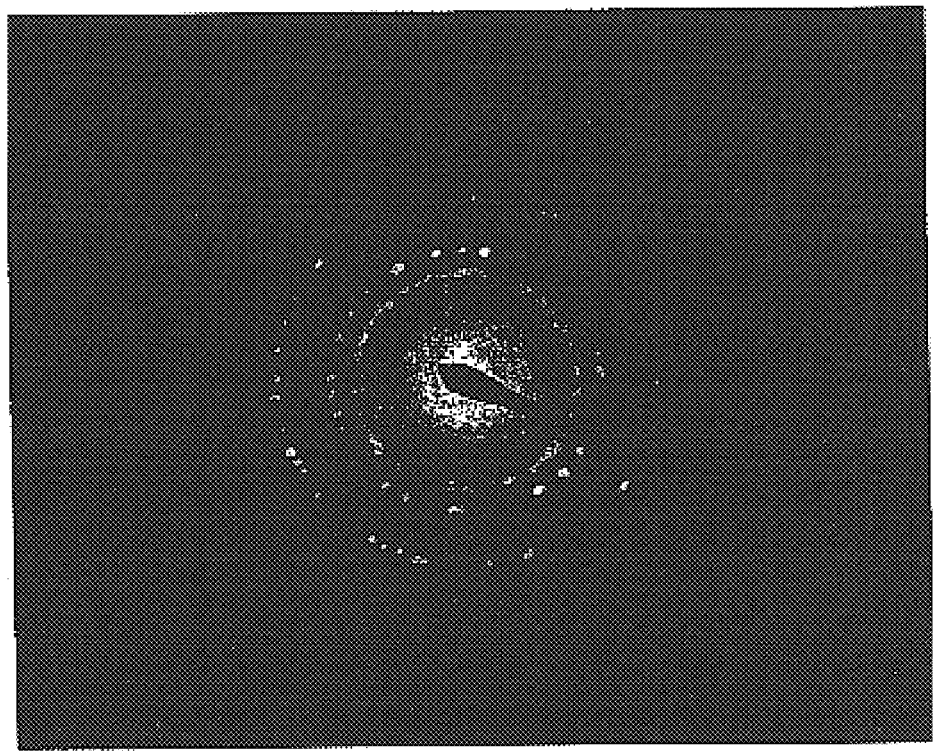
FIG. 5b is a selected area electron diffraction pattern of manganese iron oxide nanoparticles of the present invention.

About 0.38 mmol of Manganese carbonyl $Mn_2(CO)_{10}$ was then added to the reaction mixture. The temperature of the reaction mixture was rapidly increased to about 300° C. to allow the reaction mixture to reflux. After 1 hour of refluxing and stirring at about 300° C., the color of the reaction mixture turned black. The reaction mixture was then cooled to room temperature, and an excess of amount of ethanol was added to the reaction mixture, yielding a black precipitate. The precipitate was separated by centrifuging and collected. The collected black powder was then washed with an ethanol/acetone mixture and dried. Crystal structure, composition, and particle size analysis of the powder were obtained by transmission electron microscopy (TEM) imaging, energy dispersive x-ray (EDX) elemental analysis, x-ray absorption spectroscopy (XAS), and selected area electron diffraction/x-ray diffraction (SAED-XRD) crystal symmetry pattern indexing. The powder obtained was found to comprise monodisperse spinel-structured manganese iron oxide ($MnFe_2O_4$) nanocrystals, each having a particle size of about 10.6 nm±1.68 nm. FIGS. 5a and 5b include a TEM image of the $MnFe_2O_4$ nanocrystals and an SAED-XRD diffraction pattern showing the cubic spinel crystal structure of the $MnFe_2O_4$ nanocrystals, respectively.

EXAMPLE 3

A mixture of trimethylamine-N-oxide (7.60 mmol), 10-undecenoic acid or lauric acid (4.56 mmol), and 7 ml of deoxygenated dioctyl ether, each individually dehydrated and deoxygenated, were added under an inert atmosphere to a 50 ml 2-neck Schlenk flask. The flask was attached to a Schlenk vacuum-line, and a column-reflux condenser assembly was attached under a blanket of $N_2$. The mixture was homogenized with vigorous stirring and heating to about 100° C.

About 1.52 mmol of iron carbonyl ($Fe(CO)_5$) were then added to the slowly stirred reaction solution, which was at a temperature in a range from about 100° C. to about 105° C., resulting in instantaneous and aggressive reaction. Iron carbonyl addition was completed in less than a minute and the intense reaction subsided. The reaction mixture was then heated to a temperature in a range from about 120° C. to about 130° C. under $N_2$ and maintained at temperature for 1 hour with vigorous stirring.

Figure 6:
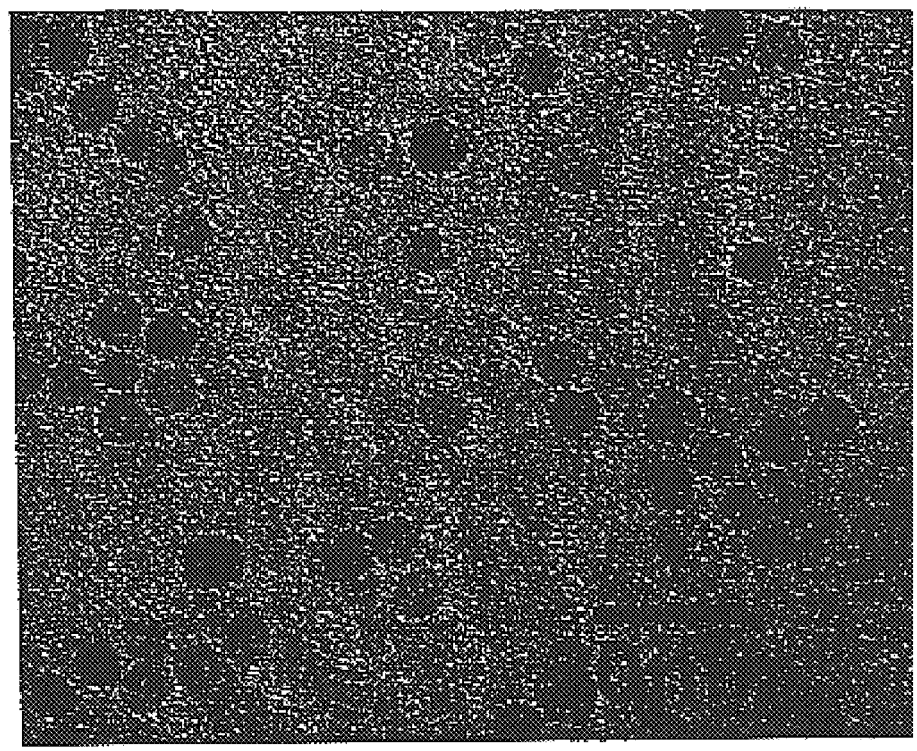
FIG. 6 is a transmission electron microscopic image of spinel-structured mixed iron oxide nanocrystals of the present invention.

About 0.76 mmol of iron carbonyl ($Fe(CO)_5$) was then added to the reaction mixture. The temperature of the reaction mixture was rapidly increased to about 300° C. to allow the reaction mixture to reflux. After 1 hour of refluxing and stirring at about 300° C., the color of the reaction mixture turned black. The reaction mixture was then cooled to room temperature, and an equal volume amount of isopropyl alcohol was added to the reaction mixture, yielding a black precipitate. The precipitate was separated by centrifuging and collected by magnetic decantation. Particles were readily dispersed in toluene and octane, forming homogeneous solutions. Crystal structure, composition, and particle size analysis of the powder were obtained by transmission electron microscopy (TEM) imaging, energy dispersive x-ray (EDX) elemental analysis, x-ray absorption spectroscopy (XAS), and selected area electron diffraction/x-ray diffraction (SAED-XRD) crystal symmetry pattern indexing. The powder obtained was found to comprise monodisperse mixed γ-iron oxide/ferrite $(\gamma\text{-}Fe_2O_3)_{1-y}(Fe_3O_4)_y$ nanocrystals, each having a particle size of about 5 nm±0.5 nm. A TEM image of the $(\gamma\text{-}Fe_2O_3)_{1-y}(Fe_3O_4)_y$ nanocrystals that were obtained are shown in FIG. 6.

While typical embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention.

What is claimed is:

1. A nanoparticle comprising:
   a) an inorganic core, wherein said inorganic core comprises a first inorganic material and is substantially crystalline and has a diameter in a range from about 1 nm to about 1000 nm; and
   b) at least one outer coating substantially covering said inorganic core, said at least one outer coating comprising at least one ionizable stabilizing material having at least one functionalized group.

2. The nanoparticle according to claim 1, wherein at least about 50% of said inorganic core comprises crystalline material.

3. The nanoparticle according to claim 2, wherein at least about 75% of said inorganic core comprises crystalline material.

4. The nanoparticle according to claim 3, wherein said inorganic core is a single crystal.

5. The nanoparticle according to claim 1, wherein said inorganic core comprises a superparamagnetic material.

6. The nanoparticle according to claim 1, wherein said inorganic core comprises at least one spinel ferrite, wherein said at least one spinel ferrite comprises iron in a first oxidation state and at least one metal in a second oxidation state, wherein said second oxidation state is different from said first oxidation state.

7. The nanoparticle according to claim 6, wherein said at least one metal comprises at least one of iron, manganese, copper, titanium, cadmium, cobalt, nickel, chromium, gadolinium, yttrium, zinc, molybdenum, and vanadium.

8. The nanoparticle according to claim 1, wherein said inorganic core has a spherical shape.

9. The nanoparticle according to claim 1, wherein said inorganic core has a diameter in a range from about 1 nm to about 100 nm.

10. The nanoparticle according to claim 9, wherein said inorganic core has a diameter in a range from about 1 nm to about 10 nm.

11. The nanoparticle according to claim 1, wherein said outer coating has a thickness that is sufficient to stabilize said nanoparticle.

12. The nanoparticle according to claim 1, wherein said thickness is in a range from about 1 nm to about 50 nm.

13. The nanoparticle according to claim 12, wherein said thickness is in a range from about 1.5 nm to about 3 nm.

14. The nanoparticle according to claim 1, wherein said ionizable stabilizing material comprises siloxane.

15. The nanoparticle according to claim 1, wherein said ionizable stabilizing material comprises at least one ionizable head portion coupled to a surface of said core and at least one tail portion coupled to said at least one ionizable head portion extending from said at least one ionizable head portion opposite said surface, and wherein said at least one functionalized group is located in said tail portion.

16. The nanoparticle according to claim 15, wherein said at least one functionalized group is located in one of an internal portion and a terminal portion of said at least one tail portion.

17. The nanoparticle according to claim 16, wherein said at least one functionalized group is located in said terminal portion.

18. The nanoparticle according to claim 16, wherein said terminal portion is hydrophobic.

19. The nanoparticle according to claim 15, wherein said at least one functionalized group is one of a polymerizable functionalized group, an initiating functionalized group, and a cross-linking functionalized group.

20. The nanoparticle according to claim 19, wherein said polymerizable functionalized group comprises at least one of an alkene, an alkyne, a vinyl, an epoxide, an azeridine, a cyclic ether, a cyclic ester, and a cyclic amide.

21. The nanoparticle according to claim 19, wherein said initiating functionalized group comprises at least one of a thermal and a photoinitiator.

22. The nanoparticle according to claim 19, wherein said initiating functionalized group comprises at least one of an azo compound, a hydroxide, a peroxide, an alkyl halide, an aryl halide, a halo ketone, a halo ester, a halo amide, a nitroxide, a thiocarbonyl, a thiol, an organo-cobalt compound, a ketone, and an amine.

23. The nanoparticle according to claim 19, wherein said cross-linking functionalized group comprises at least one of a thiol, an aldehyde, a ketone, a hydroxide, an isocyanide, an alkyl halide, a carboxylate, a carboxylic acid, a phenol, an amine, and combinations thereof.

24. The nanoparticle according to claim 15, wherein said ionizable head portion comprises at least one of an alcohol, an alcohol, a thiol, an amine, an organic carboxylate, an organic sulfonate, an organic phosphonate, and an organic phosphinate.

25. The nanoparticle according to claim 1, wherein said inorganic core comprises iron in elemental form.

26. An inorganic nanoparticle, said inorganic nanoparticle having a diameter in the range from 1 to 1000 nm and comprising a single crystal of at least one spinel ferrite, wherein said at least one spinel ferrite comprises iron in a first oxidation state and at least one metal in a second oxidation state, wherein said second oxidation state is different from said first oxidation state.

27. The inorganic nanoparticle according to claim 26, wherein said inorganic nanoparticle has a spherical shape.

28. The inorganic nanoparticle according to claim 27, wherein said inorganic nanoparticle has a diameter in a range from about 1 nm to about 100 nm.

29. The inorganic nanoparticle according to claim 28, wherein said inorganic nanoparticle has a diameter in a range from about 1 nm to about 10 nm.

30. The inorganic nanoparticle according to claim 26, wherein said at least one metal comprises at least one of manganese, copper, titanium, cadmium, cobalt, nickel, chromium, gadolinium, yttrium, zinc, molybdenum, and vanadium.

31. A nanoparticle comprising:
a) an inorganic core, said inorganic core having a diameter in the range from 1 to 1000 nm and comprising a single crystal of at least one spinel ferrite, wherein said at least one spinel ferrite comprises iron in a first oxidation state and at least one metal in a second oxidation state, wherein said second oxidation state is different from said first oxidation state; and
b) at least one outer coating substantially covering said inorganic core, said at least one outer coating comprising an ionizable stabilizing material having at least one functionalized group.

32. The nanoparticle according to claim 31, wherein said inorganic core comprises a superparamagnetic material.

33. The nanoparticle according to claim 32, wherein said at least one transition metal comprises at least one of iron, manganese, cobalt, cadmium, nickel, chromium, gadolinium, yttrium, zinc, molybdenum, and vanadium.

34. The nanoparticle according to claim 32, wherein said inorganic core has a spherical shape.

35. The nanoparticle according to claim 34, wherein said inorganic core has a diameter in a range from about 1 nm to about 100 nm.

36. The nanoparticle according to claim 35, wherein said inorganic core has a diameter in a range from about 1 nm to about 10 nm.

37. The nanoparticle according to claim 32, wherein said outer coating has a thickness that is sufficient to stabilize said nanoparticle.

38. The nanoparticle according to claim 37, wherein said thickness is in a range from about 1 nm to about 50 nm.

39. The nanoparticle according to claim 32, wherein said ionizable stabilizing material comprises siloxane.

40. The nanoparticle according to claim 32, wherein said ionizable stabilizing material comprises at least one ionizable head portion coupled to a surface of said core and at least one tail portion coupled to said at least one ionizable head portion extending from said at least one ionizable head portion opposite said surface, and wherein said at least one functionalized group is located in said tail portion.

41. The nanoparticle according to claim 40, wherein said at least one functionalized group is located in one of an internal portion and a terminal portion of said at least one tail portion.

42. The nanoparticle according to claim 41, wherein said at least one functionalized group is located in said terminal portion.

43. The nanoparticle according to claim 42, wherein said terminal portion is hydrophobic.

44. The nanoparticle according to claim 42, wherein said at least one functionalized group is one of a polymerizable functionalized group, an initiating functionalized group, and a cross-linking functionalized group.

45. The nanoparticle according to claim 44, wherein said polymerizable functionalized group comprises at least one of an alkene, an alkyne, a vinyl (including acrylics and styrenics), an epoxide, an azeridine, a cyclic ether, a cyclic ester, and a cyclic amide.

46. The nanoparticle according to claim 44, wherein said initiating functionalized group comprises at least one of a thermal and a photoinitiator.

47. The nanoparticle according to claim 44, wherein said initiating functionalized group comprises at least one of an azo compound, a hydroxide, a peroxide, an alkyl halide, an aryl halide, a halo ketone, a halo ester, a halo amide, a nitroxide, a thiocarbonyl, a thiol, an organo-cobalt compound, a ketone, and an amine.

48. The nanoparticle according to claim 44, wherein said cross-linking functionalized group comprises one of a thiol, an aldehyde, a ketone, a hydroxide, an isocyanide, an alkyl halide, a carboxylate, a carboxylic acid, a phenol, an amine, and combinations thereof.

49. The nanoparticle according to claim 40, wherein said ionizable head portion comprises at least one of an alcohol, an alcohol, a thiol, an amine, an organic carboxylate, an organic sulfonate, an organic phosphonate, and an organic phosphinate.

50. A plurality of nanoparticles, wherein each of said plurality of nanoparticles comprises:
   a) an inorganic core, wherein said inorganic core comprises a first inorganic material and is substantially crystalline and has a diameter in a range from about 1 nm to about 1000 nm; and
   b) at least one outer coating substantially covering said inorganic core, said at least one outer coating comprising at least one ionizable stabilizing material having at least one functionalized group, wherein said plurality of nanoparticles is substantially monodisperse.

51. The nanoparticle according to claim 50, wherein said inorganic core comprises a superparamagnetic material.

52. The nanoparticle according to claim 50, wherein said inorganic core comprises at least one spinel ferrite, wherein said at least one spinel ferrite comprises iron in a first oxidation state and at least one metal in a second oxidation state, wherein said second oxidation state is different from said first oxidation state.

53. The nanoparticle according to claim 52, wherein said at least one metal comprises at least one of iron, cadmium, manganese, cobalt, nickel, chromium, gadolinium, yttrium, zinc, molybdenum, and vanadium.

* * * * *